US012607256B2

(12) United States Patent (10) Patent No.: US 12,607,256 B2

Cen et al. (45) Date of Patent: Apr. 21, 2026

(54) SELF-LOCKING DRIVE AND LINEAR ACTUATOR

(71) Applicant: ZHEJIANG JIECANG LINEAR MOTION TECHNOLOGY CO., LTD., Shaoxing (CN)

(72) Inventors: Yujie Cen, Shaoxing (CN); Shiyi Tang, Shaoxing (CN)

(73) Assignee: ZHEJIANG JIECANG LINEAR MOTION TECHNOLOGY CO., LTD., Shaoxing (CN)

( * ) Notice: Subject to any disclaimer, the term of this patent is extended or adjusted under 35 U.S.C. 154(b) by 0 days.

(21) Appl. No.: 19/025,052

(22) Filed: Jan. 16, 2025

(65) Prior Publication Data

US 2025/0155003 A1     May 15, 2025

Related U.S. Application Data

(63) Continuation of application No. 18/271,268, filed as application No. PCT/CN2022/088648 on Apr. 24, 2022, now Pat. No. 12,247,646.

(30) Foreign Application Priority Data

Jun. 24, 2021    (CN) .......................... 202121418470.1

(51) Int. Cl.
    *F16H 57/039*        (2012.01)
    *F16H 35/00*         (2006.01)
    *F16H 25/20*         (2006.01)
(52) U.S. Cl.
    CPC ... *F16H 57/039* (2013.01); *F16H 2025/2031* (2013.01); *F16H 2035/005* (2013.01)

(58) Field of Classification Search
    CPC ........ F16H 48/28; F16H 48/285; F16H 48/29; F16H 2035/005; F16H 2025/209
    See application file for complete search history.

(56) References Cited

U.S. PATENT DOCUMENTS 4,679,661 A    7/1987  Gibson
6,240,797 B1   6/2001  Morishima et al.
                       (Continued)

FOREIGN PATENT DOCUMENTS

CN        110778673 A      2/2020
CN        211715696 U      10/2020
                          (Continued)

OTHER PUBLICATIONS

Jul. 28, 2022 International Search Report issued in International Patent Application No. PCT/CN2022/088648.
(Continued)

*Primary Examiner* — Bobby Rushing, Jr.
(74) *Attorney, Agent, or Firm* — Oliff PLC

(57) ABSTRACT

A self-locking drive, usable in a linear actuator, includes a housing and a drive shaft for outputting a driving force. An endcap is provided at an end portion of the housing. A self-locking mechanism configured to apply a self-locking force to the drive shaft is provided in the endcap. The self-locking mechanism includes a friction seat sleeved over the drive shaft and rotatable synchronously with the drive shaft, and a friction ring mounted in the endcap and secured to the endcap. The friction seat is interference-fitted with the friction ring to enable two-way self-locking to the drive shaft.

7 Claims, 8 Drawing Sheets

(56) References Cited

U.S. PATENT DOCUMENTS

| | | | | |
|---|---|---|---|---|
| 8,448,540 | B2 * | 5/2013 | Chiang | F16H 25/20 |
| | | | | 310/20 |
| 12,247,646 | B2 | 3/2025 | Cen et al. | |
| 2010/0139429 | A1 | 6/2010 | Ku | |
| 2012/0227522 | A1 | 9/2012 | Wu | |
| 2016/0223040 | A1 | 8/2016 | Watzek et al. | |
| 2022/0243793 | A1 | 8/2022 | Hu et al. | |
| 2023/0361649 | A1 | 11/2023 | Xu et al. | |
| 2024/0195264 | A1 | 6/2024 | Wu et al. | |
| 2024/0200626 | A1 | 6/2024 | Cen et al. | |

FOREIGN PATENT DOCUMENTS

| | | | | |
|---|---|---|---|---|
| CN | 111895061 | A * | 11/2020 | H02K 5/02 |
| CN | 212131116 | U | 12/2020 | |
| CN | 112531965 | A | 3/2021 | |
| CN | 213185772 | U | 5/2021 | |
| CN | 215334245 | U | 12/2021 | |
| EP | 4030080 | B1 | 4/2024 | |

OTHER PUBLICATIONS

Aug. 5, 2024 Non-Final Rejection received in U.S. Appl. No. 18/271,268.

Jun. 28, 2024 European Search Opinion issued in European Patent Application No. 22827169.8.

Nov. 20, 2024 Notice of Allowance issued in U.S. Appl. No. 18/271,268.

Nov. 14, 2025 Office Action issued in U.S. Appl. No. 19/025,195.

* cited by examiner

SELF-LOCKING DRIVE AND LINEAR ACTUATOR

This application is a continuation application of U.S. patent application Ser. No. 18/271,268 filed Jul. 7, 2023, which is a national phase of International Patent Application No. PCT/CN2022/088648 filed Apr. 24, 2022, which claims the benefit of Chinese Patent Application No. 202121418470.1 filed Jun. 24, 2021. The disclosure of the prior applications is hereby incorporated by references herein in its entirety.

FIELD

The disclosure relates to the field of drives, and more particularly relates to a self-locking drive and a linear actuator.

BACKGROUND

Conventional electric lifting columns are self-locked via their actuator, screw drive, or torsion spring. The actuator self-locking requires that a lead angle of the worm and worm gear drive be smaller than the equivalent friction angle. Typical worm material 40Cr and worm gear material POM100P create a friction coefficient of about 0.1 to 0.15. However, in an electric lift desk, an increased load leads to a larger worm gear stress surface. With increase of the load borne by the actuator's worm gear, the worm gear's friction force would decrease over time, which causes deterioration of self-locking performance. It is also the case for the torsion spring self-lock. The torsion spring seat is made of POM100P; when the torsion spring seat and the metal torsion spring are stressed, the friction coefficient of the torsion spring seat would decrease after operating a period of time, leading to deterioration of self-locking performance.

SUMMARY

To overcome the above and other drawbacks in the prior art, the disclosure provides a self-locking drive with a stable self-locking property.

The technical solution of the disclosure is summarized below:

A self-locking drive comprises a housing and a drive shaft for outputting a driving force, wherein an endcap is provided at an end portion of the housing, a self-locking mechanism configured to apply a self-locking force to the drive shaft is provided in the endcap; wherein the self-locking mechanism comprises a friction seat sleeved over the drive shaft and rotatable synchronously with the drive shaft, and a friction ring mounted in the endcap and secured to the endcap, the friction seat being interference-fitted with the friction ring to enable two-way self-locking to the drive shaft.

In some embodiments, the friction ring comprises an inner race and an outer race, the friction ring being sleeved to an outer periphery of the friction seat via the inner race, the outer race being snap-fitted with an inner wall of the endcap to limit circumferential rotation of the friction ring.

In some embodiments, a snap groove is provided at one of the outer race and the inner wall of the endcap, and a clamp block mated with the snap groove is provided at another one of the outer race and the inner wall of the endcap.

In some embodiments, the friction ring further comprises a positioning flange connected to the outer race, a bearing is provided outside the drive shaft, a positioning step is provided at the inner wall of the endcap, and the positioning flange is limited between the bearing and the positioning step.

In some embodiments, a notch is provided on the inner race, a connecting portion extending till the outer race is provided at each of two ends of the notch, and an oil groove for filling with lubricating oil is defined by two connecting portions.

In some embodiments, the friction seat is secured on the drive shaft via a pin shaft.

In some embodiments, the pin shaft runs radially through the drive shaft, a mounting groove is provided at a side portion of the friction seat, and the pin shaft is mounted in the mounting groove by interference-fitting.

In some embodiments, an avoidance end is provided at an end of the friction seat away from the mounting groove, the avoidance end having a gradually narrowed shape to avoid the endcap.

In some embodiments, a recess is provided on each of two sides of the self-locking mechanism relative to the drive shaft, and a snap spring for axially positioning the self-locking mechanism is snap-fitted in the recess.

A linear actuator comprises the self-locking drive noted above.

The disclosure offers the following advantages:

The disclosure discloses a drive that is usually applied to an apparatus to output a torque via the drive shaft to drive the apparatus, where the self-locking mechanism disposed in the drive can generate a self-locking force acting on the drive shaft to prevent back rotation of the drive shaft under an external force, whereby stability can be kept.

Relative rotation between the friction seat and the friction ring can create a friction force, the friction force amounting to the self-locking force for the self-locking mechanism. The friction ring is securely mounted on the endcap. Since the endcap and the housing are usually securely connected via a screw, the friction ring can maintain fixed relative to the endcap without being driven to rotate by the friction seat, while the friction seat can maintain synchronous rotation with the drive shaft. When the drive shaft starts rotating, a friction force will be created between the friction seat and the friction ring. When the drive shaft rotates normally, the driving force generated by the drive suffices to overcome the friction force; when the drive shaft needs to stop, the friction force may stop the drive shaft quickly; when the drive shaft is static, the static friction force between the friction seat and the friction ring enables the drive shaft not to rotate when being subjected to an external force; as such, a stable self-locking performance is offered. In addition, irrespective of whether the drive shaft rotates forwardly or backwardly, the magnitude of friction force does not change, which enables two-way self-locking to the drive shaft.

Furthermore, the friction ring comprises an inner race and an outer race, the friction ring being sleeved to an outer periphery of the friction seat via the inner race, the outer race being snap-fitted with an inner wall of the endcap to limit circumferential rotation of the friction ring. Once the outer race of the friction ring is snap-fitted with the endcap, circumferential rotation of the friction ring is limited, which may ensure creation of the self-locking force; in addition, the snap-fitting manner simplifies the fitting between friction ring and the endcap, which eliminates a need of interference-fitting, such that no damages would be caused to the friction ring or the endcap during assembly. By sleeving the friction ring outside the friction seat, a reactive force from the friction seat against the friction ring acts on the radial direction of the friction ring, not on the axial direction, such that the fitting between the friction ring and the endcap would not be affected.

Furthermore, a snap groove is provided at one of the outer race and the inner wall of the endcap, and a clamp block mated with the snap groove is provided at another one of the outer race and the inner wall of the endcap. After the clamp block is snapped into the snap groove, rotation of the friction ring may be limited. The size of the snap groove may be made slightly larger than that of the clamp block, such that even a certain angular change of the friction ring in the circumferential direction does not suffice to affect operation; this may ease the requirement on mold design.

Furthermore, the friction ring further comprises a positioning flange connected to the outer race, a bearing is provided outside the drive shaft, a positioning step is provided at the inner wall of the endcap, and the positioning flange is limited between the bearing and the positioning step. After the bearing is sleeved over the drive shaft, the inner ring of the bearing can rotate synchronously with the drive shaft; the friction ring is first mounted in the endcap and then the endcap is mounted on the housing; upon completion of the mounting, the positioning flange is disposed between the positioning step and the outer ring of the bearing, whereby the positioning flange is axially limited, which limits axial displacement of the friction ring, preventing the self-locking mechanism from becoming structurally loose during operation.

Furthermore, a notch is provided on the inner race, a connecting portion extending till the outer race is provided at each of two ends of the notch, and an oil groove for filling with lubricating oil is defined by two connecting portions. When the friction seat is mounted in the inner race, the notch may also be deformed to a certain extent under the squeezing action by the friction seat, which enlarges the width of the notch to facilitate mounting of the friction seat. Lubricating oil may be filled in the oil groove; the lubricating oil may access between the friction seat and the inner race when the friction seat is rotating, whereby wear between the friction seat and the friction ring is reduced, and the heat generated is lowered.

Furthermore, the friction seat is secured on the drive shaft via a pin shaft. Rotation of the friction seat relative to the drive shaft may be limited by the pin shaft, such that the friction seat may maintain a synchronous rotation with the drive shaft. Moreover, by fixing the friction seat via the pin shaft, it eliminates a necessity of mounting the friction seat on the drive shaft by interference-fitting, such that the drive shaft will not be damaged during mounting the friction seat on the drive shaft; in addition, the drive shaft does not rely on the friction force with respect to the friction seat to maintain synchronous rotation of the friction seat, such that the drive shaft will not be damaged during operating.

Furthermore, the pin shaft runs radially through the drive shaft, a mounting groove is provided at a side portion of the friction seat, and the pin shaft is mounted in the mounting groove by interference-fitting. To mount the friction seat on the drive shaft, the pin shaft is first mounted, and then the mounting groove is aligned with the pin shaft to complete fitting between the friction seat and the pin shaft; this facilitates assembly. The interference-fitting between the pin shaft and the friction seat can secure the friction seat to the drive shaft and limit axial displacement of the friction seat on the drive shaft, thereby ensuring stability of the self-locking mechanism.

Furthermore, an avoidance end is provided at an end of the friction seat away from the mounting groove, the avoidance end having a gradually narrowed shape to avoid the endcap. Since the friction seat needs to be fitted with the pin shaft, while the pin shaft is the part driving the friction seat during rotating of the drive shaft, no deformation shall occur to the pin shaft. The pin shaft has a certain diameter; therefore, in order to accommodate the pin shaft, the friction seat also has a corresponding thickness. If the friction seat is too thick, it will contact the endcap, affecting mounting of the endcap and wearing the inner surface of the endcap; by providing an avoidance end on the friction seat, the endcap is avoided without shrinking the thickness of the friction seat.

Furthermore, a recess is provided on each of two sides of the self-locking mechanism relative to the drive shaft, and a snap spring for axially positioning the self-locking mechanism is snap-fitted in the recess. The snap spring, after being mounted in the recess, projects out of the surface of the drive shaft, whereby the self-locking mechanism may be positioned, preventing disengagement between the friction seat and the friction ring affecting performance of the self-locking mechanism.

The disclosure further discloses a linear actuator, in which the self-locking drive disclosed above is disposed. The linear actuator is configured to control linear movement of an object via a lifting column, where the lifting column is driven by the drive; a self-locking mechanism is provided in the drive; this may prevent retraction of the lifting column when being subjected to an external force and enables the rotating drive shaft to stop quickly, whereby telescopic precision of the lifting column is improved.

These characteristics and advantages of the present disclosure will be disclosed in detail in the preferred embodiments below with reference to the accompanying drawings.

BRIEF DESCRIPTION OF THE DRAWINGS

Hereinafter, the disclosure will be further described with reference to the accompanying drawings, in which.

Figure 1:
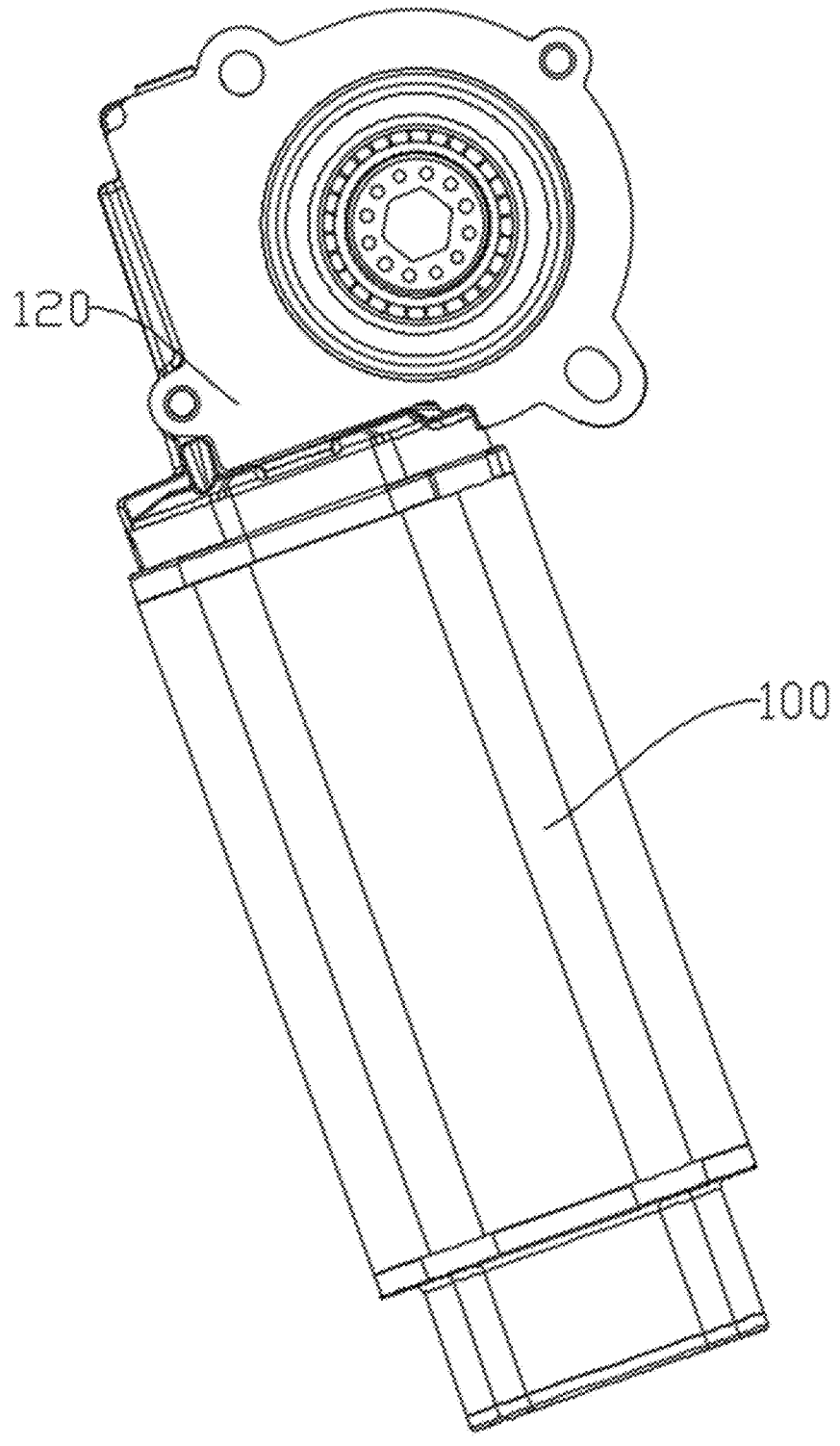
FIG. 1 is a structural schematic diagram of a drive in some embodiments of the disclosure.

REFERENCE SIGNS 100. housing; 110. drive shaft; 120. endcap; 130. clamp block; 140. bearing; 150. positioning step; 160. pin shaft; 170. through hole; 180. recess;

200. friction seat; 210. mounting groove; 220: avoidance end;

300. friction ring; 310. oil groove; 320. inner race; 330. outer race; 340. notch; 350. connecting portion; 360. snap groove; 370. positioning flange; 400. snap spring.

DETAILED DESCRIPTION

Hereinafter, the technical solutions of the disclosure will be explained and illustrated through embodiments with reference to the accompanying drawings. However, the embodiments are only preferred embodiments of the disclosure, not all of them. Other embodiments derived by those skilled in the art without exercise of inventive work based on the examples in the embodiments all fall within the protection scope of the disclosure.

In the description of the disclosure, it needs to be understood that the orientational or positional relationships indicated by the terms "center," "longitudinal," "transverse," "length," "width," "thickness," "upper," "lower," "front," "rear," "left," "right," "vertical," "horizontal," "top," "bottom," "inner," "clockwise," and "counterclockwise" refer to those orientational and positional relationships illustrated in the drawings, which are intended only for facilitating description of the disclosure and simplifying relevant depictions, but not for indicating or implying that the devices or elements compulsorily possess such specific orientations or are compulsorily configured and operated with the specific orientations; therefore, such terms should not be construed as limitations to the disclosure.

Besides, the terms "first" and "second" are only used for descriptive purposes, which shall not be construed as indicating or implying relative importance or implicitly indicating the number of technical features referred to. Therefore, the features limited by "first" and "second" may explicitly or implicitly include one or more of such features. In the description of the present disclosure, unless otherwise indicated, "plurality" indicates two or more.

In the disclosure, unless otherwise explicitly provided and limited, the terms such as "mount," "connect," "attach," and "fix" should be understood broadly, which, for example, may refer to a fixed connection, a detachable connection, or an integrated connection; which may be a mechanical connection or an electrical connection; which may be a direct connection or an indirect connection via an intermediate medium; which may also be a communication between the insides of two elements. To a person of ordinary skill in the art, specific meanings of the above terms in the disclosure may be construed based on specific situations.

In the disclosure, unless otherwise explicitly provided and limited, an expression that a first feature is "above" or "below" a second feature may refer to a direct contact between the first feature and the second feature or may refer to a scenario where although the first feature and the second feature do not contact directly, they contact via a further feature therebetween. Moreover, the expression that the first feature is "above" or "over" or "on" the second feature refers to a situation where the first feature is exactly or generally over the second feature or only refers to a situation that the horizontal height of the first feature is higher than the second feature. The expression that the first feature is "under" or "below" or "beneath" the second feature refers to a situation where the first feature is exactly or generally below the second feature or only refers to a situation that the horizontal height of the first feature is lower than the second feature.

Referring to FIGS. 1 to 8, embodiments of the disclosure disclose a self-locking drive, comprising a housing 100 and a drive shaft 110 for outputting a driving force, where an endcap 120 is provided at an end portion of the housing 100; a self-locking mechanism applying a self-locking force to the drive shaft 110 is provided in the endcap 120; the self-locking mechanism comprises a friction seat 200 sleeved over the drive shaft 110 and rotatable synchronously with the drive shaft 110, and a friction ring 300 mounted in the endcap 120 and secured to the endcap 120, the friction seat 200 being interference-fitted with the friction ring 300 to enable two-way self-locking to the drive shaft 110.

The disclosure discloses a drive that is usually applied to an apparatus to output a torque via the drive shaft 110 to drive the apparatus, where the self-locking mechanism disposed in the drive can generate a self-locking force acting on the drive shaft 110 to prevent back rotation of the drive shaft 110 under an external force, whereby stability can be kept.

Relative rotation between the friction seat 200 and the friction ring 300 can create a friction force, the friction force amounting to the self-locking force for the self-locking mechanism. The friction ring 300 is securely mounted on the endcap 120. Since the endcap 120 and the housing 100 are usually securely connected via a screw, the friction ring 300 can maintain fixed relative to the endcap 120 without being driven to rotate by the friction seat 200, while the friction seat 200 can maintain synchronous rotation with the drive shaft 110. When the drive shaft 110 starts rotating, a friction force will be created between the friction seat 200 and the friction ring 300. When the drive shaft 110 rotates normally, the driving force generated by the drive suffices to overcome the friction force; when the drive shaft 110 needs to stop, the friction force may stop the drive shaft 110 quickly; when the drive shaft 110 is static, the static friction force between the friction seat 200 and the friction ring 300 enables the drive shaft 110 not to rotate when being subjected to an external force; as such, a stable self-locking performance is offered. In addition, irrespective of whether the drive shaft 110 rotates forwardly or backwardly, the magnitude of friction force does not change, which enables two-way self-locking to the drive shaft 110. The friction ring 300 is made of PEEK and the fiction seat 200 is made of PPS or PEEK, which impart a good high-temperature-resistance property to the friction ring 300 and the friction seat 200, such that their inherent friction coefficients do not decrease at an elevated temperature, whereby a stable self-locking performance may be maintained.

The friction ring 300 is sleeved over the friction seat 200. The drive shaft 110, when rotating, brings the friction seat 200 to rotate relative to the friction ring 300 such that a sliding friction occurs therebetween and heat will also be generated. In addition, since the drive shaft 110 has a relatively high rotational speed, after long-term running, the friction ring 300 and the friction seat 200 will wear to a certain extent, such that their friction coefficients will decrease, leading to decrease in the self-locking force. Therefore, an oil groove 310 where lubricating oil may be stored is provided on the friction ring 300; the lubricating oil may be adhered to the outer periphery of the friction seat 200 to access between the friction seat 200 and the friction ring 300, whereby wear may be reduced, the life of the self-locking mechanism is extended, and the heat generated is lowered.

Figure 4:
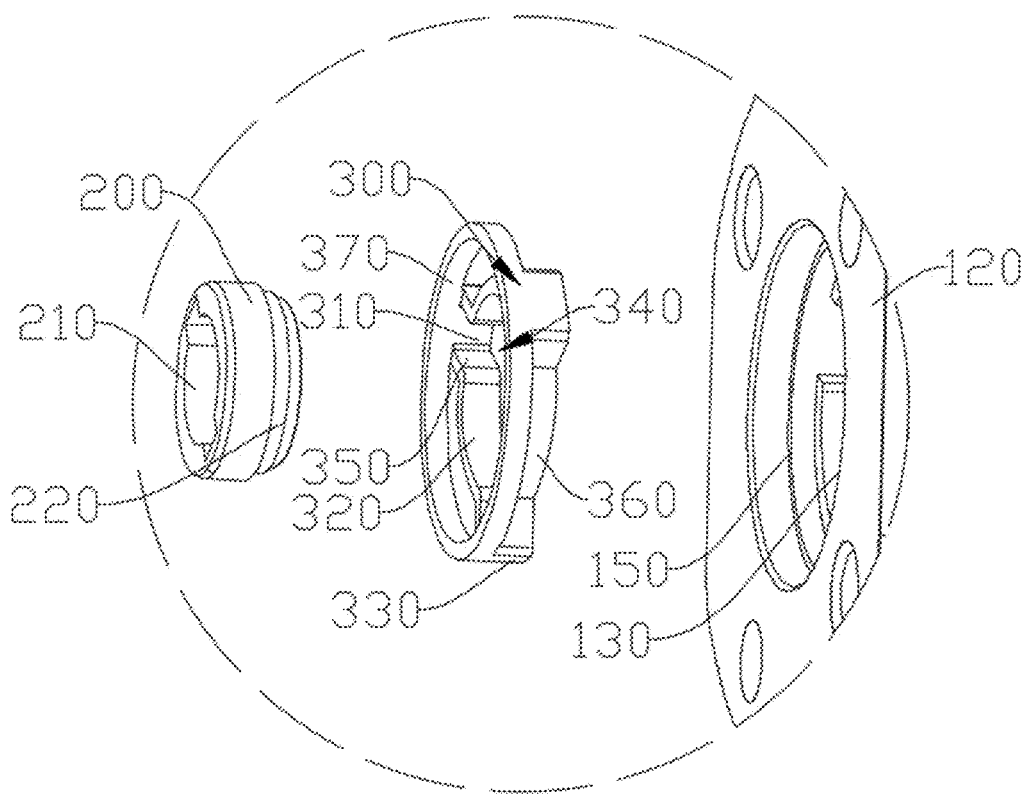
FIG. 4 is an enlarged view of part 4 in FIG. 2.
Figure 5:
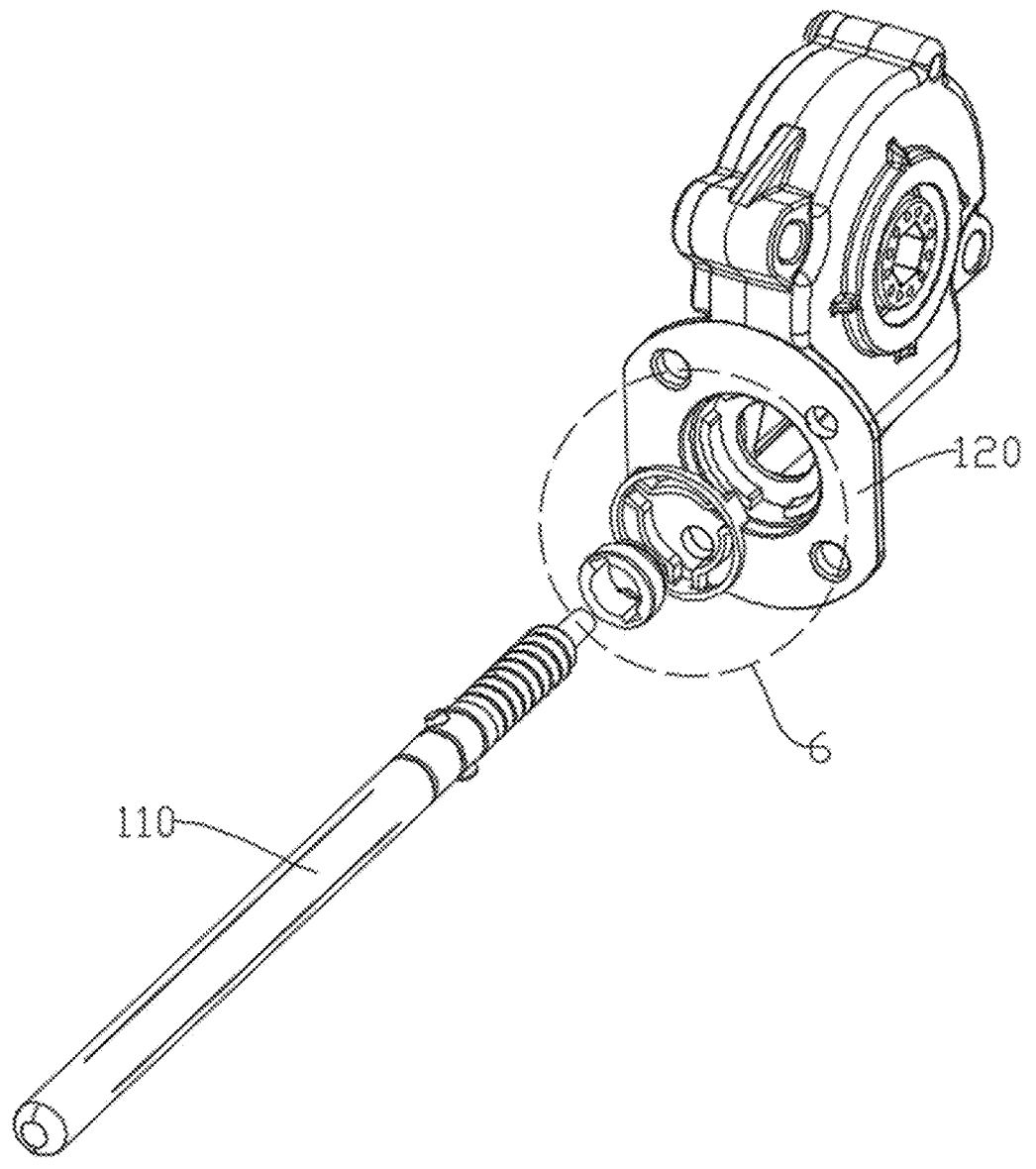
FIG. 5 is a view of the drive in some embodiments of the disclosure.
Figure 6:
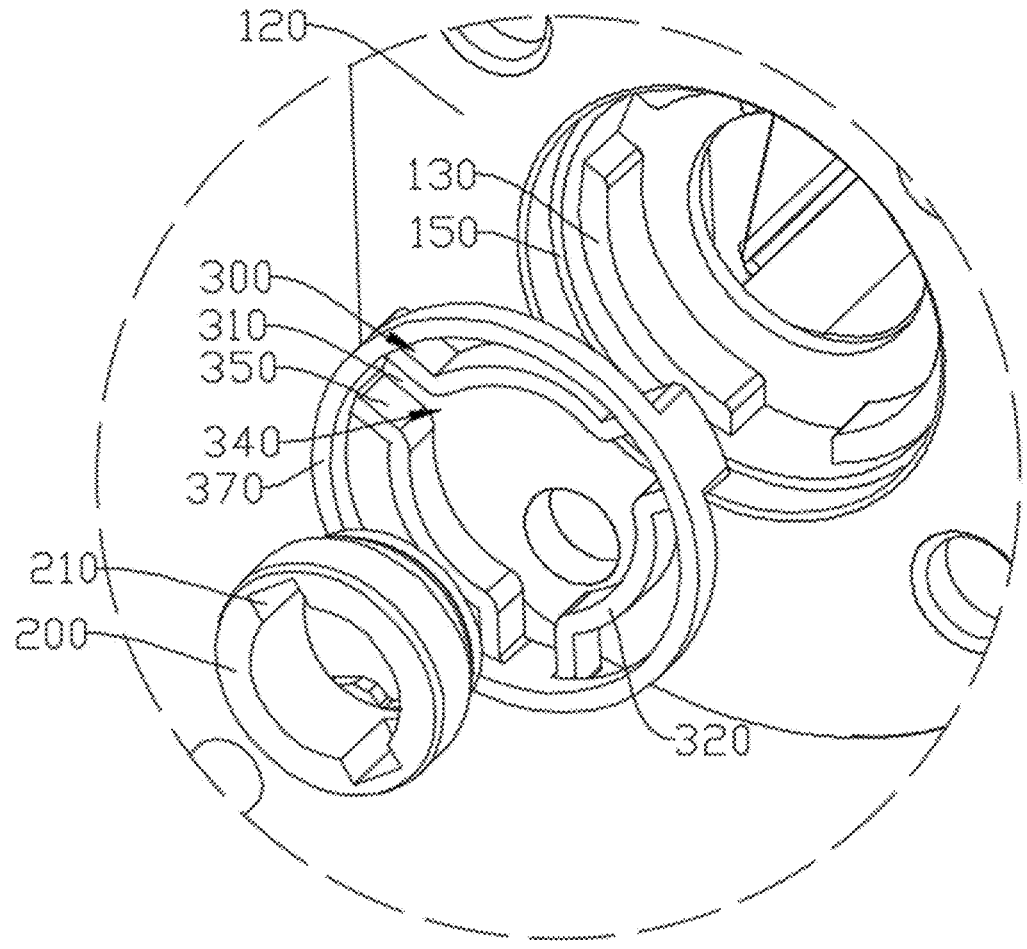
FIG. 6 is an enlarged view of part 6 in FIG. 5.
Figure 7:
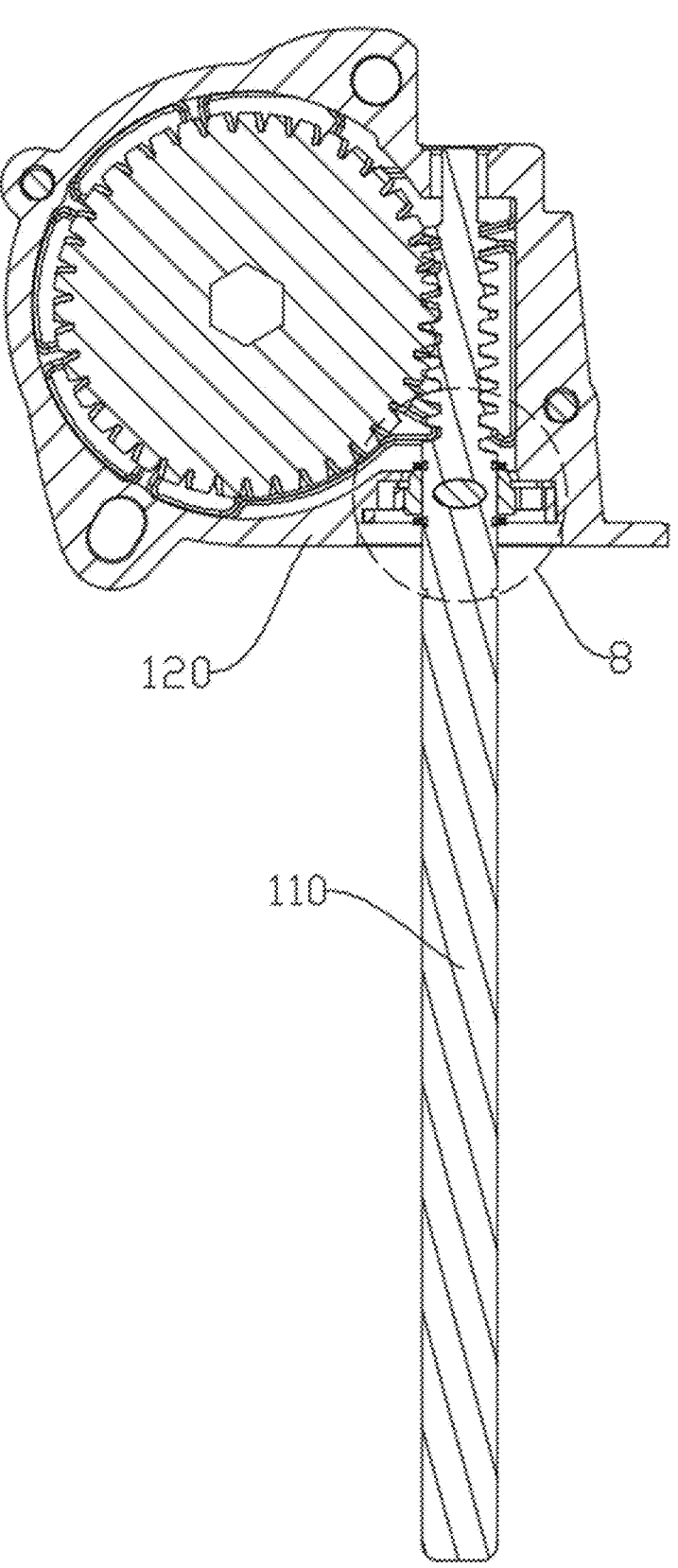
FIG. 7 is a sectional view of the drive in some embodiments of the disclosure.
Figure 8:
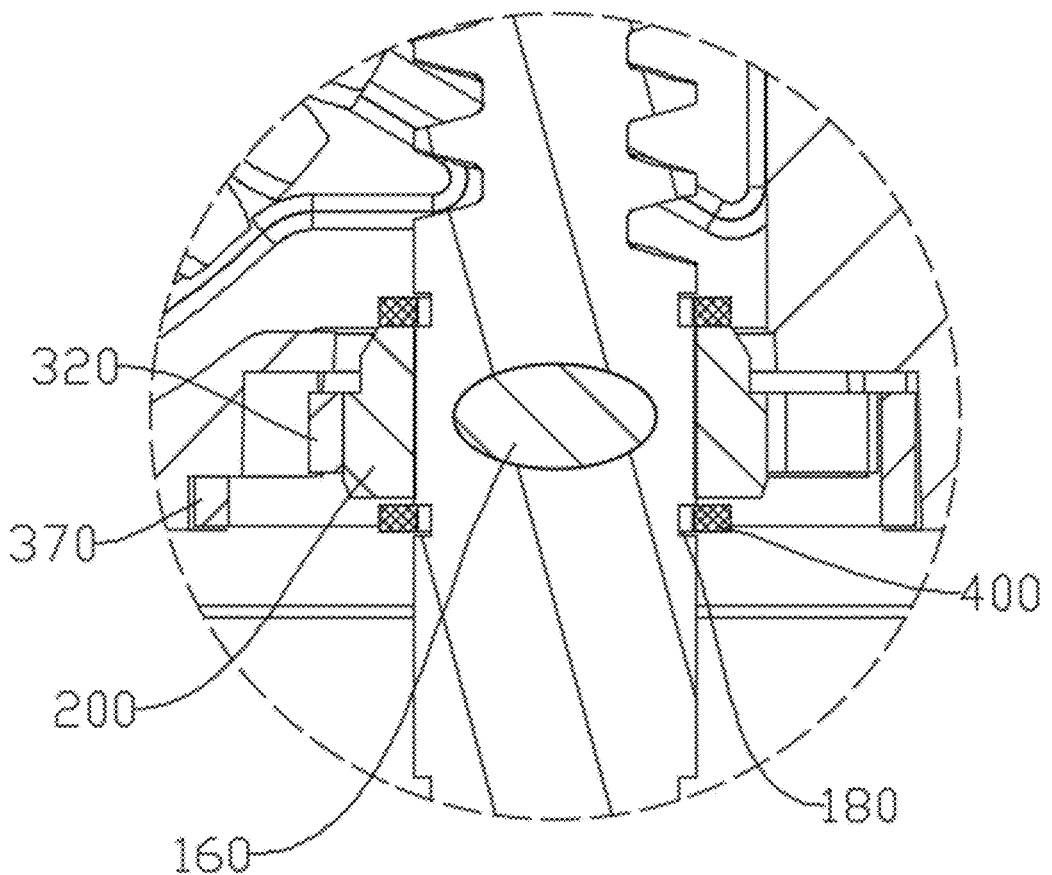
FIG. 8 is an enlarged view of part 8 in FIG. 7.

Referring to FIGS. 4 and 6, a structure of the friction ring 300 will be specifically described in another embodiment of the disclosure based on the embodiment noted above.

Specifically, the friction ring 300 comprises an inner race 320 and an outer race 330, the friction ring 300 being sleeved to the outer periphery of the friction seat 200 via the inner race 320, the outer race 330 being snap-fitted with the inner wall of the endcap 120 to limit circumferential rotation of the friction ring 300.

Once the outer race 330 of the friction ring 300 is snap-fitted with the endcap 120, the circumferential rotation of the friction ring 300 is limited, which may ensure creation of the self-locking force; in addition, the snap-fitting manner simplifies the fitting between the friction ring 300 and the endcap 120, which eliminates a need of interference-fitting, such that no damages would be caused to the friction ring 300 or the endcap 120 during assembly. By sleeving the friction ring 300 outside the friction seat 200, the reactive force from the friction seat 200 against the friction ring 300 acts on the radial direction of the friction ring 300, not on the axial direction, such that the fitting between the friction ring 300 and the endcap 120 would not be affected.

The oil groove 310 is defined by the inner race 320. A notch 340 is provided on the inner race 320, a connecting portion 350 extending to the outer race 330 is provided at each of the two ends of the notch 340 such that the oil groove 310 is enclosed by the two connecting portions 350 and the outer race 330. The outer periphery of the friction seat 200 abuts against the inner race 320 and is thereby connected to the oil groove 310, which may facilitate the lubricating oil to access the outer periphery of the friction seat 200. When the friction seat 200 is mounted in the inner race 320, the notch 340 may also be deformed to a certain extent under the squeezing action by the friction seat 200, which enlarges the width of the notch 340 to facilitate mounting of the friction seat 200. More notches 340 may also be provided, which, on one hand, may increase storage of the lubricating oil, and on the other hand, may reduce the reactive force acting on the inner race 320, whereby cracking of the inner race 320 is prevented.

In one embodiment of the disclosure, the friction ring 300 is snapped into the endcap 120 via the outer race 330. FIGS. 4 and 6-8 illustrate another embodiment of the disclosure, where it is specifically described how the friction ring 300 is fitted with the endcap 120.

Specifically, a snap groove 360 recessed towards the center direction is provided on the outer race 330; a clamp block 130 convex toward the center direction is provided on the inner wall of the endcap 120; after the clamp block 130 is snapped into the snap groove 360, rotation of the friction ring 300 may be limited. The size of the snap groove 360 may be made slightly larger than that of the clamp block 130, such that even a certain angular change of the friction ring 300 in the circumferential direction does not suffice to affect operation; this may ease the requirement on mold design. Of course, the clamp block 130 may be alternatively provided on the outer race 330, and the snap groove 360 may be provided on the inner wall of the endcap 120.

To axially limit the friction ring 300 so as to prevent the friction ring 300 from disengaging from the clamp block 130 and from rotating with the friction seat 200, the friction ring 300 further comprises a positioning flange 370 connected to the outer race 330. The positioning flange 370 is an annular flange with the same outer diameter and inner diameter as the outer race 330 of the friction ring 300. A bearing 140 is provided outside the drive shaft 110, where the bearing 140 is sleeved over the drive shaft 110, the outer ring of the bearing 140 abutting against the inner wall of the housing 100, the inner ring of the bearing 140 being rotatable synchronously with the drive shaft 110. A positioning step 150 is provided on the inner wall of the endcap 120. After the friction ring 300 is mounted in the endcap 120, the endcap 120 is mounted on the housing 100. Upon completion of the mounting, the positioning flange 370 is disposed between the positioning step 150 and the outer ring of the bearing 140, whereby the positioning flange 370 is axially limited, which further limits axial displacement of the friction ring 300. The positioning flange 370 may be clamped by the positioning step 150 and the outer ring of the bearing 140; or alternatively, a gap may be reserved therebetween, in which case although a certain displacement recess 180 is provided in the axial direction, the displaced distance does not suffice to affect stability of the self-locking mechanism.

Figure 2:
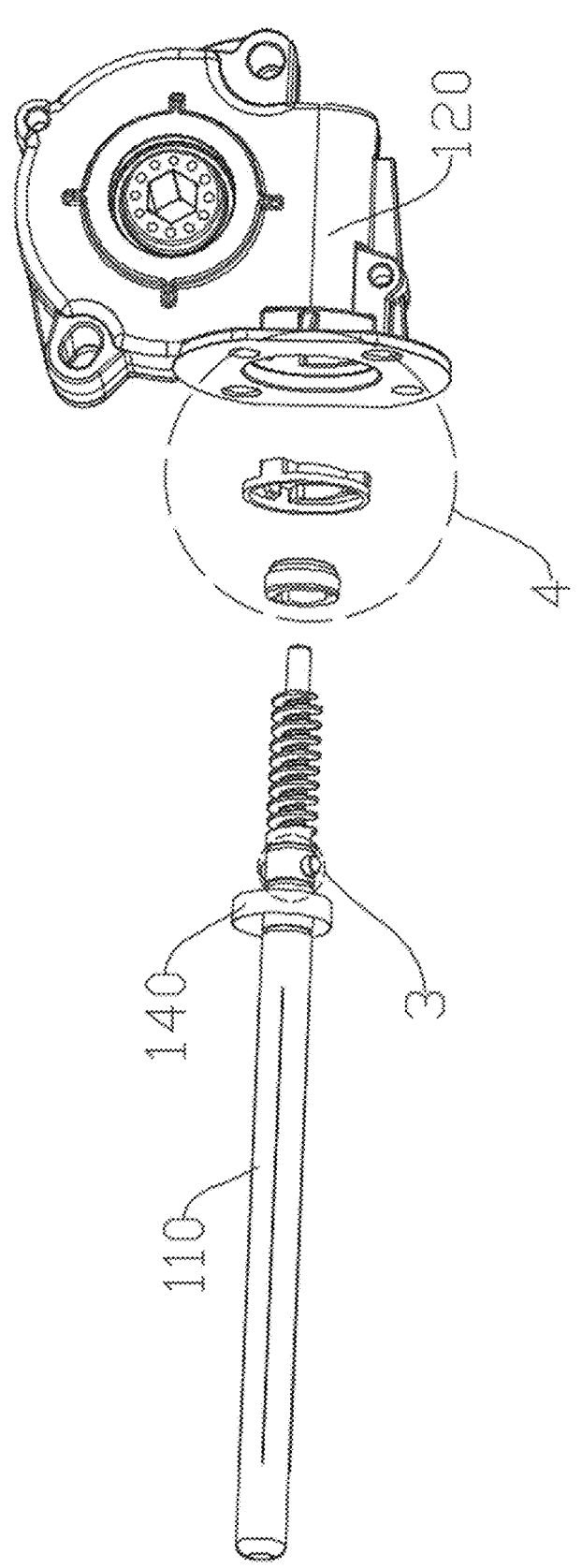
FIG. 2 is a view of the drive in some embodiments of the disclosure.
Figure 3:
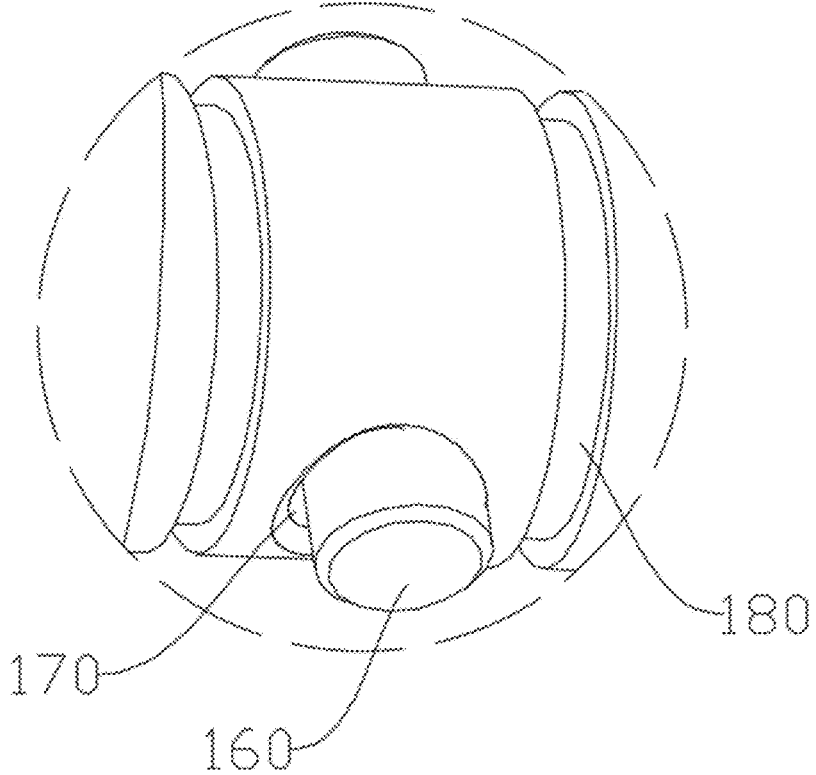
FIG. 3 is an enlarged view of part 3 in FIG. 2.

FIGS. 2-4 illustrate a structure formed by mounting the friction seat 200 on the drive shaft 110 in another embodiment of the disclosure based on the embodiment noted above.

The friction seat 200 is sleeved over the drive shaft 110 and secured thereto via a pin shaft 160. When the drive shaft 110 rotates, the pin shaft 160 may be brought to rotate synchronously, further driving the friction seat 200 to rotate. By fixing the friction seat 200 via the pin shaft 160 which plays a role of positioning and securing the friction seat 200, it eliminates a necessity of mounting the friction seat 200 on the drive shaft 110 by interference-fitting, such that the drive shaft 110 will not be damaged during mounting the friction seat 200 on the drive shaft 110; in addition, the drive shaft 110 does not rely on the friction force with respect to the friction seat 200 to maintain synchronous rotation of the friction seat 200, such that the drive shaft 110 will not be damaged during operating.

In a conventional electric motor self-locking structure, a collar is usually mounted on the motor shaft by interference-fitting, with the circumferential rotation of the collar being limited. When the motor shaft is rotating, a braking force will be created between the collar and the motor shaft; however, during the collar mounting process, the interference-fitting manner will cause certain damages to the motor shaft, e.g., burrs; in addition, noises will be generated during relative rotation between the motor shaft and the collar. In contrast, the drive according to the disclosure will not cause damages to the parts therein when assembling the self-locking mechanism; in addition, since no relative friction occurs between the drive shaft 110 and the friction seat 200, no wear will occur to the drive shaft 110.

A through-hole 170 running radially through is provided in the drive shaft 110, the pin shaft 160 being disposed in the through-hole 170; a mounting groove 210 is provided at a side portion of the friction seat 200, and the pin shaft 160 is mounted in the mounting groove 210 by interference-fitting; to mount the friction seat 200 on the drive shaft 110, the pin shaft 160 is first mounted, and then the mounting groove 210 is aligned with the pin shaft 160 to complete fitting between the friction seat 200 and the pin shaft 160; this facilitates assembly. The interference-fitting between the pin shaft 160 and the friction seat 200 can secure the friction seat 200 to the drive shaft 110 and limit axial displacement of the friction seat 200 on the drive shaft 110, thereby ensuring stability of the self-locking mechanism.

Since the friction seat 200 needs to be fitted with the pin shaft 160, while the pin shaft 160 is the part driving the friction seat 200 during rotating of the drive shaft 110, no deformation shall occur to the pin shaft 160. The pin shaft 160 has a certain diameter; therefore, in order to accommodate the pin shaft 160, the friction seat 200 also has a corresponding thickness. If the friction seat 200 is too thick, it will contact the endcap 120, affecting mounting of the endcap 120 and wearing the inner surface of the endcap 120; therefore, an avoidance end 220 is provided at the end of the friction seat 200 away from the mounting groove 210; the avoidance end 220 has a gradually narrowed shape so as to avoid the endcap 120; in this way, the self-locking mechanism will not be affected by the endcap 120, and the thickness of the friction seat 200 will not be reduced.

Referring to FIGS. 2-8, in another embodiment of the disclosure, considering the fitting manner between the friction seat 200 and the friction ring 300 and the fitting manner between the friction seat 200 and the pin shaft 160, it still likely occurs that the self-locking mechanism is unstable, which would affect the performance of the self-locking mechanism.

In this respect, a recess 180 is provided on each of the two sides of the self-locking mechanism relative to the drive shaft 110, a snap spring 400 for axially positioning the self-locking mechanism is snap-fitted in the recess 180, the snap spring 400, after being mounted in the recess 180, projecting out of the surface of the drive shaft 110, whereby the friction seat 200 may be limited to prevent disengagement between the friction seat 200 and the pin shaft 160, which may also maintain fitting between the friction seat 200 and the friction ring 300.

The disclosure further discloses a linear actuator, in which the self-locking drive is disposed. The linear actuator is configured to control linear movement of an object via a lifting column, where the lifting column is driven by the drive; a self-locking mechanism is provided in the drive; this may prevent retraction of the lifting column when being subjected to an external force and enables the rotating drive shaft to stop quickly, whereby the telescopic precision of the lifting column is improved.

The telescopic speed of a typical lifting column is 35 mm/s, and the lead of the internal screw is 10+10; due to the small screw lead, self-lock is typically implemented by a combination of the actuator, the torsion spring, and the screw. If the lift speed of the typical telescopic column increases to 80 mm/s to 150 mm/s or the load of the conventional telescopic column increases to four times static self-lock, if the self-locking still relies on the combination of actuator, torsion spring, and screw, the higher lift speed will lead to a higher motor rotating speed and a larger noise. If the lead of the screw changes to 20+20, since the screw's self-locking force decreases, load capacity of the whole desk decreases in the load testing. However, with the drive provided by the disclosure, the linear actuator is not only adapted to an increased overall load of the lift apparatus, but also improves self-locking performance of the whole desk with a larger screw lead or removal of torsion spring.

What have been described above are only embodiments of the disclosure; however, the protection scope of the disclosure is not limited thereto. A person skilled in the art should understand that the disclosure includes, but is not limited to, the contents described in the drawings and the embodiments. Any modifications without departing from the functions and structural principles of the disclosure will be included within the scope of the claims.

What is claimed is:

1. A self-locking drive, comprising:
   a housing and a drive shaft for outputting a driving force, wherein:
   an endcap is provided at an end portion of the housing;
   a self-locking mechanism configured to apply a self-locking force to the drive shaft is provided in the endcap;

the self-locking mechanism comprises a friction seat sleeved over the drive shaft and rotatable synchronously with the drive shaft, and a friction ring mounted in the endcap and secured to the endcap, an interference-fitting surface of the friction seat and an interference-fitting surface of the friction ring facing each other in a radial direction perpendicular to a rotation axis of the drive shaft, the interference-fitting surface of the friction seat being interference-fitted to the interference-fitting surface of the friction ring to enable self-locking of the self-locking mechanism to the drive shaft in both (i) a first rotary direction about the drive shaft and (ii) a second rotary direction about the drive shaft, the second rotary direction being opposite to the first rotary direction; and
   the friction seat is secured on the drive shaft via a pin shaft, the pin shaft runs radially through the drive shaft, a mounting groove is provided in the friction seat, and the pin shaft is mounted in the mounting groove by interference-fitting; and
   an avoidance end is provided at an end of the friction seat away from the mounting groove, the avoidance end having a gradually narrowed shape to avoid the endcap.

2. The self-locking drive according to claim 1, wherein the friction ring comprises an inner race and an outer race, the friction ring being sleeved to an outer periphery of the friction seat via the inner race, the outer race being snap-fitted with an inner wall of the endcap to limit circumferential rotation of the friction ring.

3. The self-locking drive according to claim 2, wherein a snap groove is provided at one of the outer race and the inner wall of the endcap, and a clamp block mated with the snap groove is provided at another one of the outer race and the inner wall of the endcap.

4. The self-locking drive according to claim 2, wherein the friction ring further comprises a positioning flange connected to the outer race, a bearing is provided outside the drive shaft, a positioning step is provided at the inner wall of the endcap, and the positioning flange is limited between the bearing and the positioning step.

5. The self-locking drive according to claim 2, wherein a notch is provided on the inner race, a connecting portion extending till the outer race is provided at each of two ends of the notch, and an oil groove for filling with lubricating oil is defined by two connecting portions.

6. The self-locking drive according to claim 1, wherein an outer peripheral surface of the friction seat covers longitudinal ends of the pin shaft.

7. A linear actuator, comprising the self-locking drive according to claim 1.

* * * * *